United States Patent
Lee et al.

(10) Patent No.: US 12,155,189 B2
(45) Date of Patent: Nov. 26, 2024

(54) WIRABLE BRACKET AND MODULE COUPLING DEVICE COUPLED THERETO

(71) Applicant: SAMWON ACT CO., LTD., Busan (KR)

(72) Inventors: Kyung Wook Lee, Ansan-si (KR); Kyung Yul Lee, Bucheon-si (KR); Hong Suk Han, Siheung-si (KR); Jae Sung Choi, Ansan-si (KR)

(73) Assignee: SAMWON ACT CO., LTD., Busan (KR)

( * ) Notice: Subject to any disclaimer, the term of this patent is extended or adjusted under 35 U.S.C. 154(b) by 423 days.

(21) Appl. No.: 17/623,118

(22) PCT Filed: Jun. 25, 2020

(86) PCT No.: PCT/KR2020/008241
§ 371 (c)(1),
(2) Date: Dec. 27, 2021

(87) PCT Pub. No.: WO2020/262968
PCT Pub. Date: Dec. 30, 2020

(65) Prior Publication Data
US 2022/0231495 A1    Jul. 21, 2022

(30) Foreign Application Priority Data

Jun. 26, 2019   (KR) .................... 10-2019-0076239
Oct. 16, 2019   (KR) .................... 10-2019-0128698

(51) Int. Cl.
*H02G 3/04*      (2006.01)
*H02G 3/06*      (2006.01)

(52) U.S. Cl.
CPC ......... *H02G 3/0437* (2013.01); *H02G 3/0608* (2013.01)

(58) Field of Classification Search
None
See application file for complete search history.

(56) References Cited

U.S. PATENT DOCUMENTS

| 6,323,421 | B1 * | 11/2001 | Pawson | H02G 3/0418 |
| | | | | 52/220.1 |
| 7,939,759 | B2 * | 5/2011 | Henry | H02G 3/0406 |
| | | | | 174/101 |
| 8,748,746 | B2 * | 6/2014 | Brasier | H02G 3/0443 |
| | | | | 174/505 |
| 2011/0171852 | A1 | 7/2011 | Henry | |
| 2014/0216809 | A1 * | 8/2014 | Mayo | A47B 57/581 |
| | | | | 174/503 |

(Continued)

FOREIGN PATENT DOCUMENTS

| JP | 2005-16161 A | 1/2005 |
| JP | 2007-124847 A | 5/2007 |

(Continued)

*Primary Examiner* — Krystal Robinson
(74) *Attorney, Agent, or Firm* — Birch, Stewart, Kolasch & Birch, LLP

(57) ABSTRACT

The present invention has the following configuration. The present invention relates to a wirable bracket attached to a wall body, the bracket being characterized by comprising: a rib which is bound to an upper portion of the bracket by inserting a metal panel; and a wiring part inserted into a hollow space section formed in the rib.

20 Claims, 25 Drawing Sheets

(56) References Cited

U.S. PATENT DOCUMENTS

2015/0173528 A1* 6/2015 Hester-Redmond ........................ F21V 33/0012
211/26

FOREIGN PATENT DOCUMENTS

| KR | 20-1994-0002343 Y1 | 4/1994 |
| KR | 20-2016-0001736 U | 5/2016 |

* cited by examiner

WIRABLE BRACKET AND MODULE COUPLING DEVICE COUPLED THERETO

CROSS REFERENCE TO RELATED APPLICATIONS

This application is the National Phase of PCT International Application No. PCT/KR2020/008241, filed on Jun. 25, 2020, which claims priority under 35 U.S.C. 119(a) to Patent Application Nos. 10-2019-0076239, filed in the Republic of Korea on Jun. 26, 2019 and 10-2019-0128698, filed in the Republic of Korea on Oct. 16, 2019, all of which are hereby expressly incorporated by reference into the present application.

TECHNICAL FIELD

The present disclosure relates to a wirable bracket and a module coupling device coupled thereto.

BACKGROUND ART

FIG. 9 is a view showing wiring of a connector for standardizing a wiring duct for each module as a background art.

First, when a wiring duct for each unit module is standardized, a wiring duct is made into a unit module, and then disposition and connection method of a connector, the direction of power, the polarity of a wire, the position of a coupler, installation and a cover of a lamp, etc. are standardized for each unit module.

Construction, wiring design, etc. of the manufactured wiring duct for each unit module are consistently shown. Further, this is for easy maintenance of the wiring duct.

When a wiring duct for each unit module, a duct 30 with predetermined specifications is prepared, and various components that are disposed, arranged, or provided inside or outside the duct 30 are prepared.

As the components, a plurality of sets of wires 14 that are arranged to both ends of the duct 30 with predetermined specifications are prepared to have a predetermined length.

It is preferable that the wires have predetermined colors that can be easily discriminated.

A female connector 12 and a male connector 10 are coupled to both ends of each wire 14, respectively.

A plurality of terminal blocks, etc. is prepared to fix the wires arranged in the internal space of the duct 30.

All components for standardizing a wiring duct for a unit module are prepared, and then, an assembly process is performed.

That is, a male connector 10 is disposed at a side of the wiring duct 30 for a unit module and a female connector 12 is disposed at another side. For example, the male connector 10 is disposed at the left side of the duct 30 and the female connector 12 is disposed at the right side of the duct 30. The male connector 10 and the female connector 12 are disposed at positions where work is easy, respectively.

First, according to the related art, when a wiring duct for a unit module is standardized, a wiring duct is made into a unit module.

Disposition and connection method of a connector, the direction of power, the polarity of a wire, the position of a coupler, installation and a cover of a lamp, etc. are standardized for each unit module.

Construction, wiring design, etc. of the manufactured wiring duct for each unit module are consistently shown for easy maintenance of the wiring duct.

When a wiring duct for each unit module, a duct 30 with predetermined specifications is prepared, and various components that are disposed, arranged, or provided inside or outside the duct 30 are prepared.

All components for standardizing a wiring duct for a unit module are prepared, and then, an assembly process is performed.

That is, a male connector 10 is disposed at a side of the wiring duct 30 for a unit module and a female connector 12 is disposed at another side. For example, the male connector 10 is disposed at the left side of the duct 30 and the female connector 12 is disposed at the right side of the duct 30. It is preferable that the male connector 10 and the female connector 12 are disposed at positions where work is easy, respectively.

A plurality of pairs of wires 14 disposed between the male connector 10 and the female connector 12 is given a distinguishable mark. The number of wires to be connected may be changed and the disposition positions may be changed in accordance with the shape of the connector 10 or the capacity of the wires 14.

However, since the configuration described above is made by a separate wiring duct, wiring is performed after interior materials are finished or wiring is performed by a specific electrical wireman before interior materials are finished.

In this case, when a metal panel is inserted in a bracket, it was difficult to avoid a defect that the metal plate cannot be inserted in the portion of a duct where wiring is performed, so separate work is required, or the bracket cannot be attached to a wall, so it takes a lot of cost and time to perform interior construction on the corresponding portion.

The present disclosure has been designed on the basis of this background.

DISCLOSURE

Technical Problem

A first subject is to be able to connect a wire to a desired portion by forming a structure that can pass the wire at a frame of a bracket. Further, the first subject is to configure an interior material and dispose various signal lines by configuring wiring by forming passages through which various signal lines can pass between brackets.

A second subject is to easily and simultaneously achieve a metal interior material and wiring by making a product with a harness embedded in a bracket to be able to function as various signal lines and by making it possible to connect signal lines in a one-touch type between brackets.

A third subject is to insert a metal panel at the upper portion of a bracket by configuring an exclusive bracket attached with a structure for various terminals. A space is configured at the portion corresponding to the coupling portion of a bracket and a locking/unlocking switch portion is configured and easily couples and decouples various module devices through the space.

Accordingly, a wall-hanging fixing module for electrical wiring and installation of a consent module, a switch module, a lamp, etc. is easily configured.

Technical Solution

The following configuration is provided to solve the subjects described above.

A wirable bracket includes:
a bracket that is attached to a wall;
ribs configured at the bracket;

a space configured at the ribs; and a wiring portion inserted in the space, in which a metal panel is inserted and coupled at an upper portion of the bracket.

In this case, it is preferable that the bracket is configured to be extended and disposed left, right, up, and down, and a terminal portion is configured such that wires are connected in a one-touch type between the bracket and an adjacent bracket.

In this case, it is preferable that the wiring portion is composed of an embossed terminal and an engraved terminal, or an embossed terminal and an embossed terminal, or an engraved terminal and an engraved terminal at an end of the space, and the terminals are connected with each other through a wire.

In this case, it is preferable that protrusions are configured at an edge of the bracket such that the metal panel is firmly inserted, a curved portion is configured at an edge of the metal panel, holes corresponding to the protrusions are configured at the curved portion, a wire is connected, and then the metal panel that is an interior material is attached such that the wire does not protrude outside.

In this case, it is preferable that the bracket is configured in a rectangular shape, the ribs are configured at four positions inside a center portion of each side of the rectangle, and the four ribs are concentrated to a center portion to configure a frame of the bracket.

In this case, it is preferable that the space is configured at the coupling portion such that wires are disposed.

In this case, it is preferable that wire drawing-out holes are configured at the coupling portion such that wires are drawn out.

The following configuration is provided for a module coupling device that is coupled to the coupling portion of the wirable bracket.

In this case, the module coupling device has a module device coupled to the coupling portion configured at the intersection of the ribs of the wirable bracket, and coupled to at an upper portion of a portion corresponding to the coupling portion.

In this case, it is preferable that coupling recessions are configured at a portion, where the ribs are not configured, on the bottom of the coupling portion.

In this case, it is preferable that the module device coupled to the coupling portion is a switch module and switch coupling protrusions are configured at a lower portion of the switch module.

In this case, it is preferable that the coupling recessions and the switch coupling protrusions are coupled and decoupled by a one-touch type locking/unlocking switch portion.

In this case, it is preferable that the module device coupled to the coupling recessions is a consent module and consent coupling protrusions are configured at a lower portion of the consent module.

In this case, it is preferable that a wall fixing hole is configured at a center portion of the consent module for fastening to a wall.

In this case, it is preferable that the module device coupled to the coupling recessions is a wall-hanging fixing module for a lamp and is coupled to wall-hanging coupling protrusions formed at a lower portion of the wall-hanging fixing module.

In this case, it is preferable that recessions corresponding to the ribs are configured at the lower portion of the wall-hanging fixing module to be seated on the ribs.

In this case, it is preferable that the wall-hanging fixing module has first coupling holes to couple an intermediate member to couple a base member 480 supporting the lamp having various sizes, is configured to be screw-fastened to the intermediate member through the first coupling holes, and screw-fastens the intermediate member and the base member of the lamp.

Advantageous Effects

A first effect is to be able to connect a wire to a desired portion by forming a structure that can pass the wire at a frame of a bracket. There is an effect of configuring an interior material and dispose various signal lines by configuring wiring by forming passages through which various signal lines can pass between brackets.

A second effect is to be able to function as various signal lines by making a product with a harness embedded in a bracket. There is an effect of easily and simultaneously achieving a metal interior material and wiring by making it possible to connect signal lines in a one-touch type between brackets.

The third effect is that various terminals configure an exclusive bracket attached to a bracket. A metal panel is inserted at the upper portion of a bracket and a space is configured at the portion corresponding to the coupling portion of a bracket. A locking/unlocking switch portion is configured and easily couples and decouples various module devices through the space. Accordingly, a wall-hanging fixing module for electrical wiring and installation of a consent module, a switch module, a light, etc. is easily configured.

That is, after a metal panel is completed as an interior material, a wall-hanging fixing module, etc. for installing a consent module, a switch module, a lamp, etc. are inserted, whereby an interior wall and electrical wiring are simultaneously constructed. There is an effect that it is possible to greatly reduce time and costs for the configuration of inserting a device according to electrical wires by performing separate work after the interior is completed.

DESCRIPTION OF DRAWINGS

FIG. 2b is a rear view of FIG. 2a.

BEST MODE

Figure 1A:
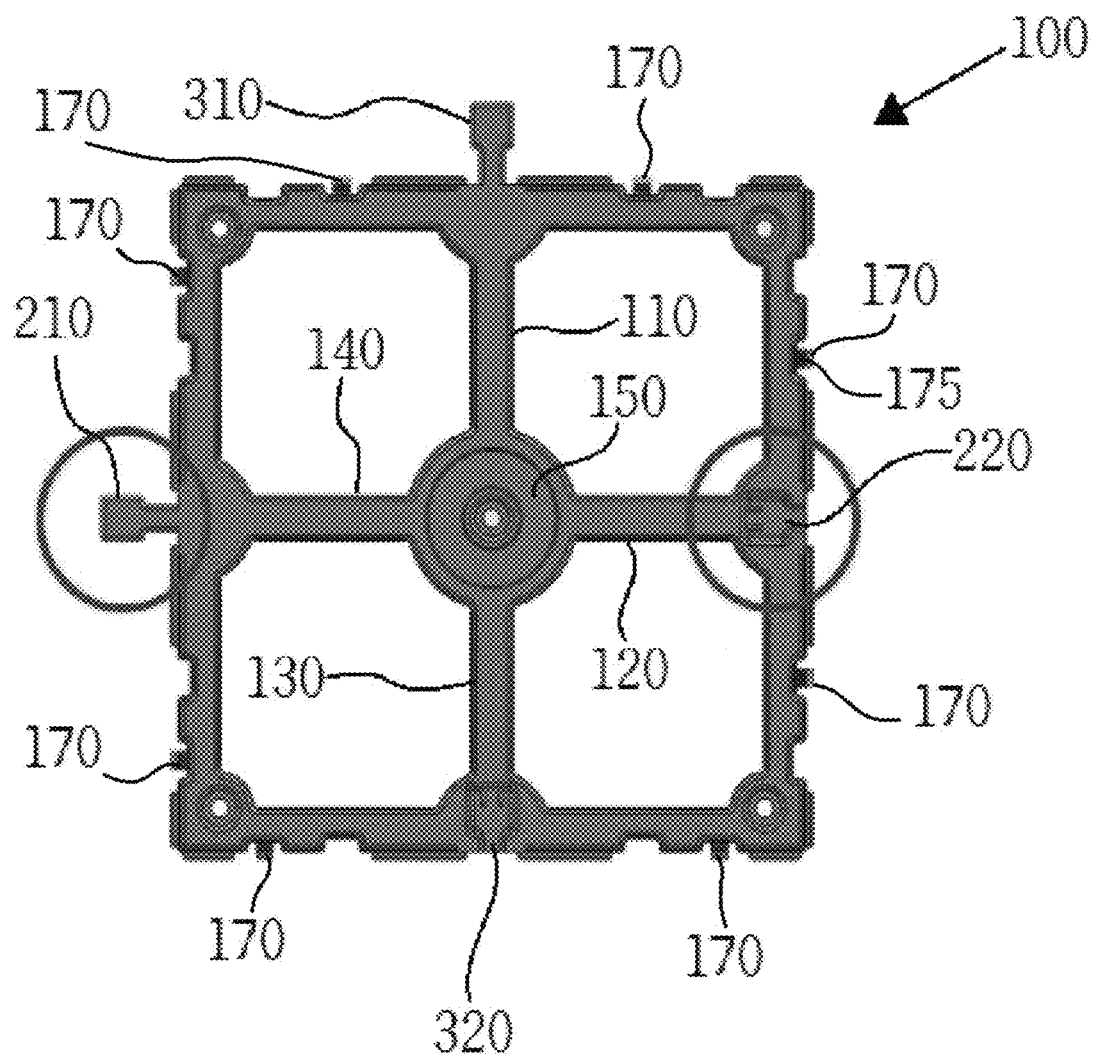
FIG. 1a shows a terminal bracket in which a bracket and a leading wire are integrated.
Figure 1B:
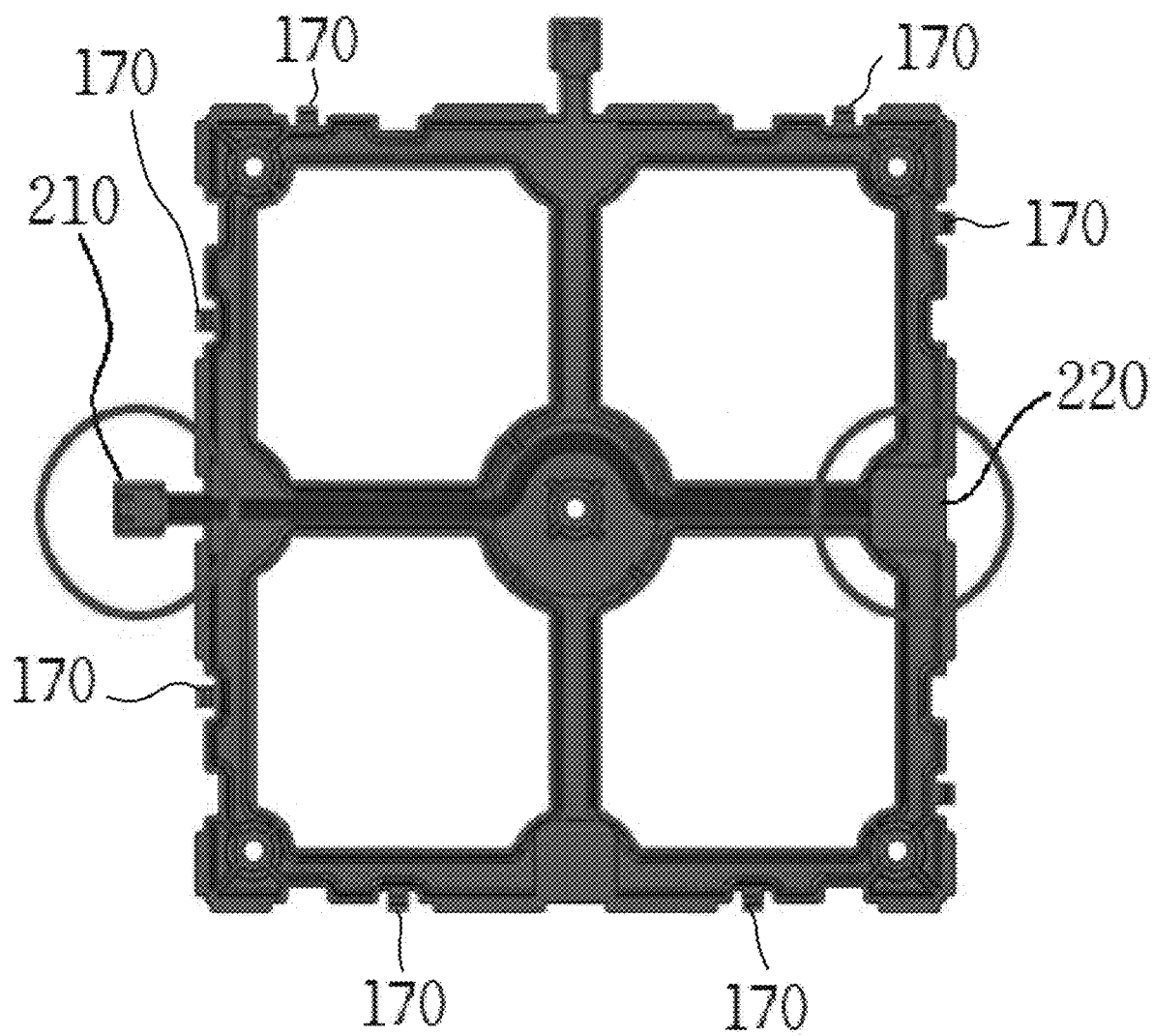
FIG. 1b is a view showing the rear surface of a 1-shaped wiring bracket.
Figure 1C:
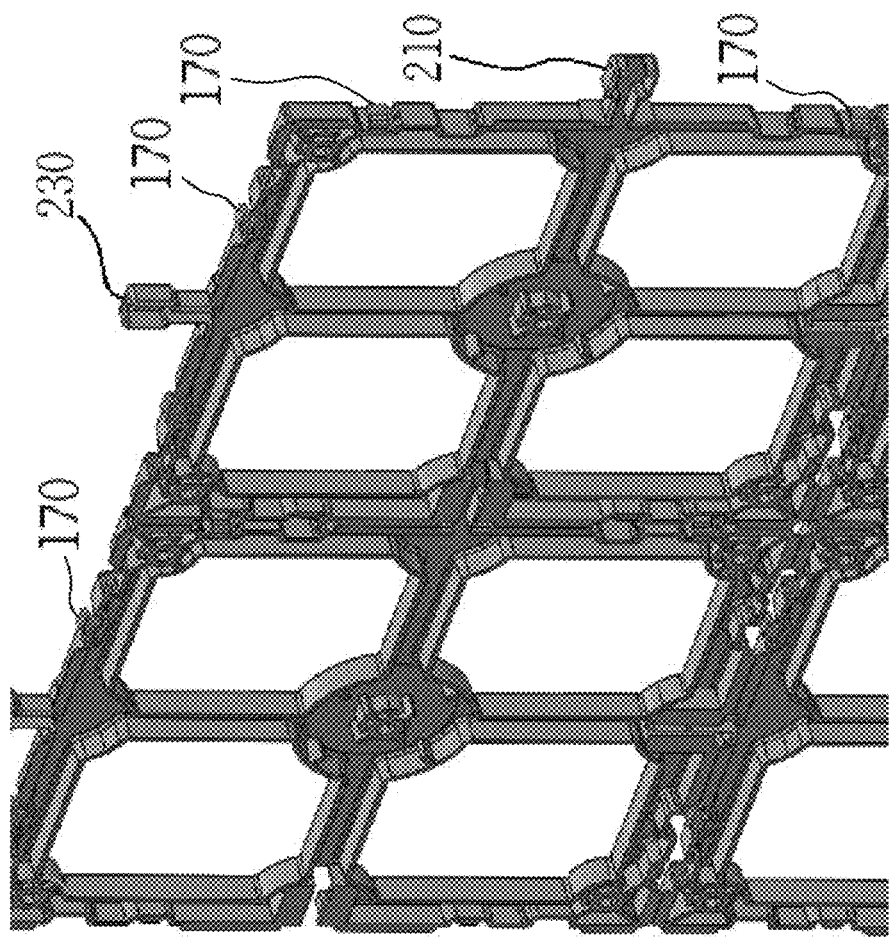
FIG. 1c is a view showing the rear surface of a L-shaped wiring bracket.
Figure 1D:
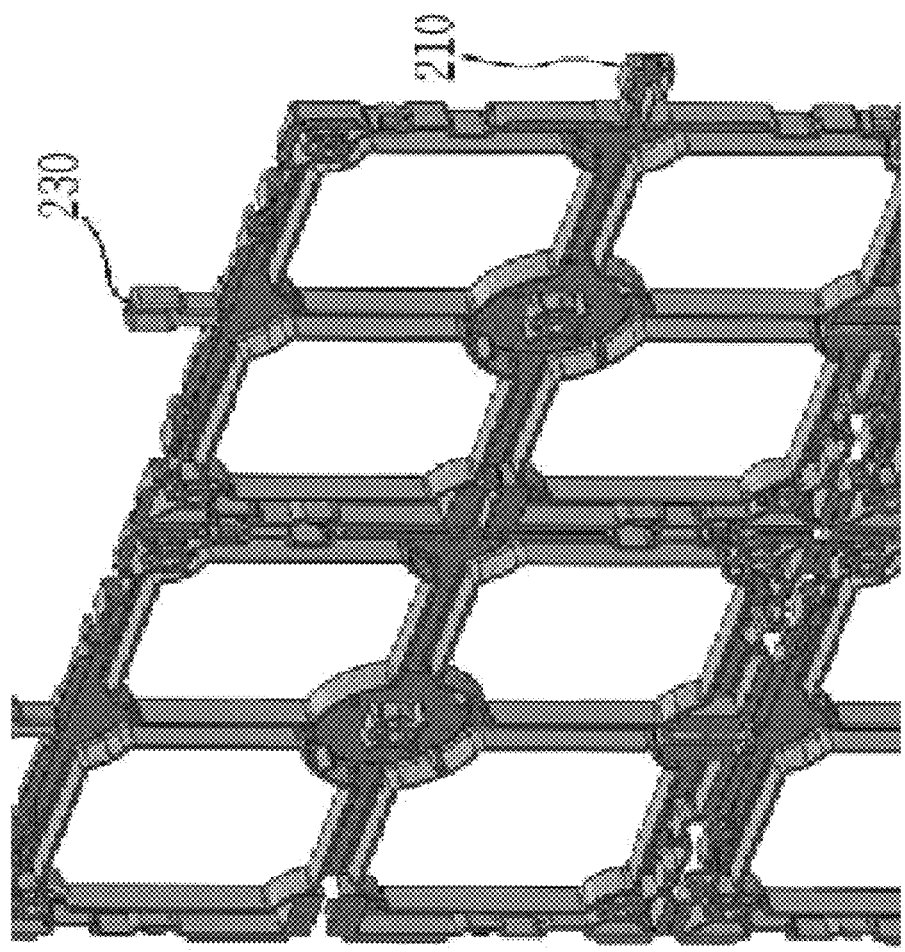
FIG. 1d is a view showing connection of the unit brackets of FIGS. 1a to 1c.

A second embodiment of the best mode for invention is as follows. There is provided a module coupling device having various module devices 410, 420, and 430 coupled to a coupling portion 150, which is configured at an intersection of ribs 110, 120, 130, and 140 of a wirable bracket that is a first embodiment, over the portions corresponding to the coupling portions.

The coupling portion 150 has coupling recessions 155, 156, 157, and 158 on the bottom of the coupling portion where the ribs are not configured.

The prevent disclosure is described hereafter with reference to FIGS. 3a to 3e.

The module device that is coupled to the recessions 155, 156, 157, and 158 is a consent module 410, and a consent coupling protrusion 415 is configured at a lower portion of the consent module 410, so the coupling portion 150 of the bracket and the consent module 410 are coupled.

Figure 4A:
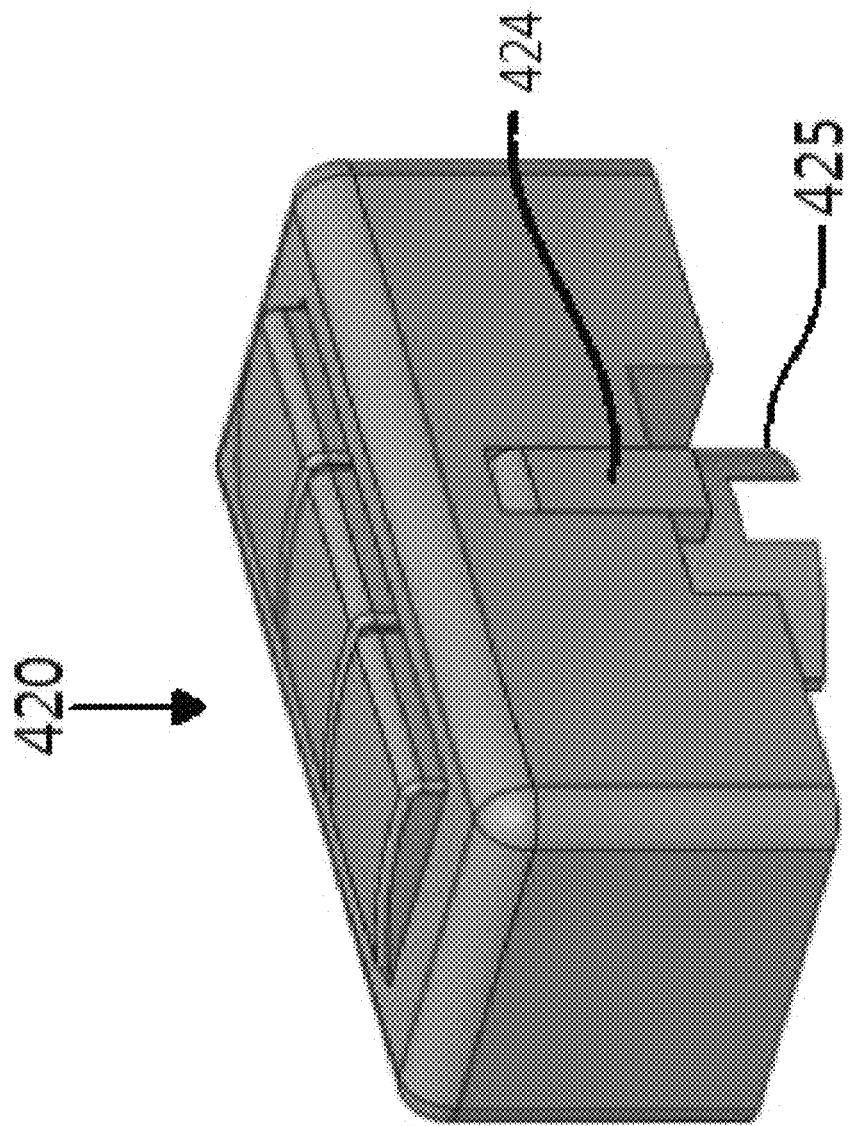
FIGS. 4a to 4d are views showing a switch and fixing of the switch to a bracket.
Figure 4B:
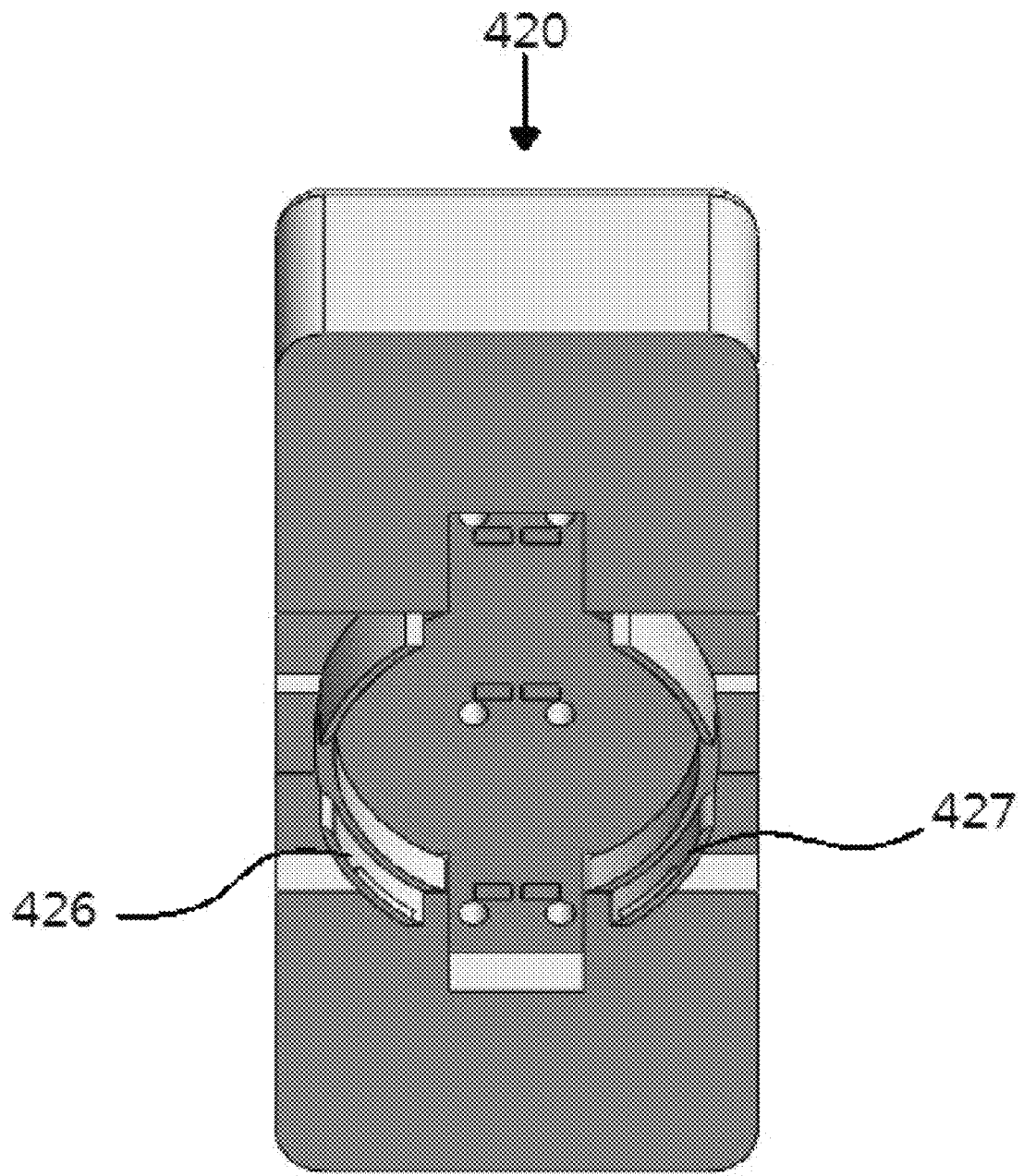
Figure 4C:
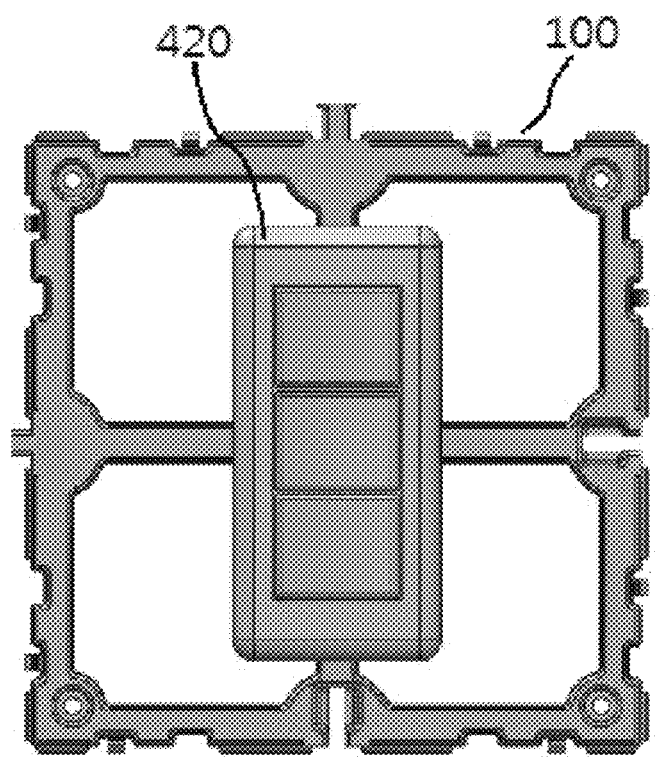
Figure 4D:
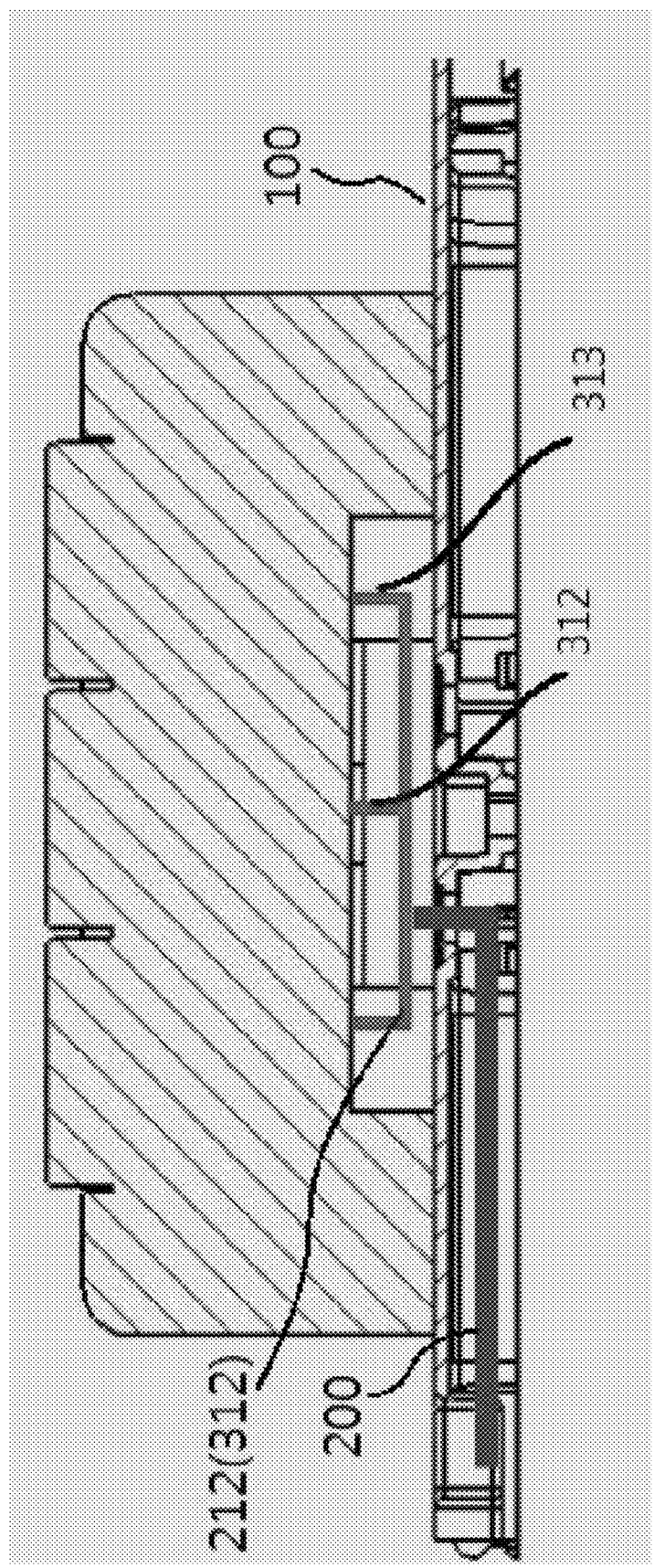

A locking/unlocking switch portion 424 configured in FIG. 4A may be applied to the consent module when coupling.

A wall fixing hole 440 is configured at a center portion of the consent module to fasten to a wall.

The consent module, in which a cord is frequently inserted and drawn out, is configured for supplementation because when a large force is applied, a force may be insufficient only with the fixing bracket.

A wire disposed through the ribs of the bracket to supply power to the consent module 410 is inserted in the consent module.

Figure 3A:
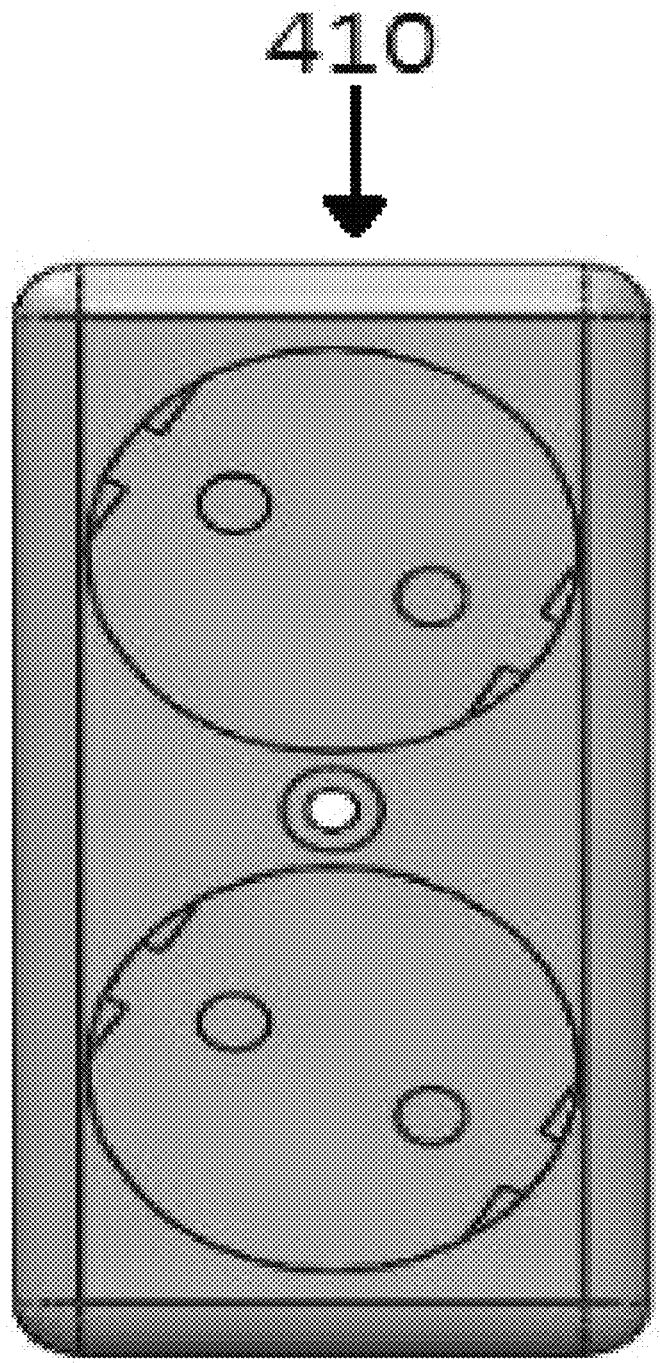
FIGS. 3a to 3e are views showing a consent and fixing of the consent to a bracket.
Figure 3B:
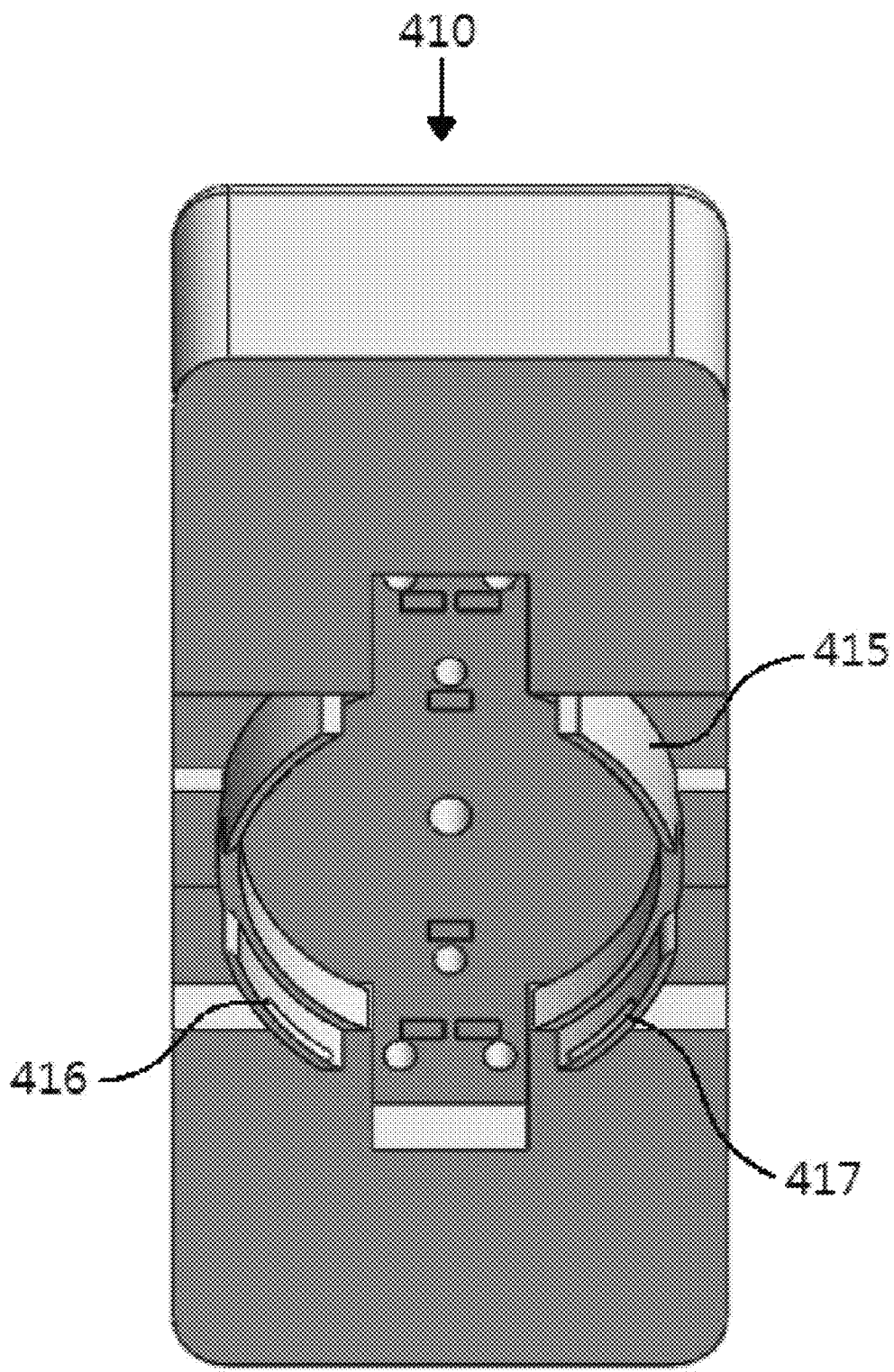
Figure 3C:
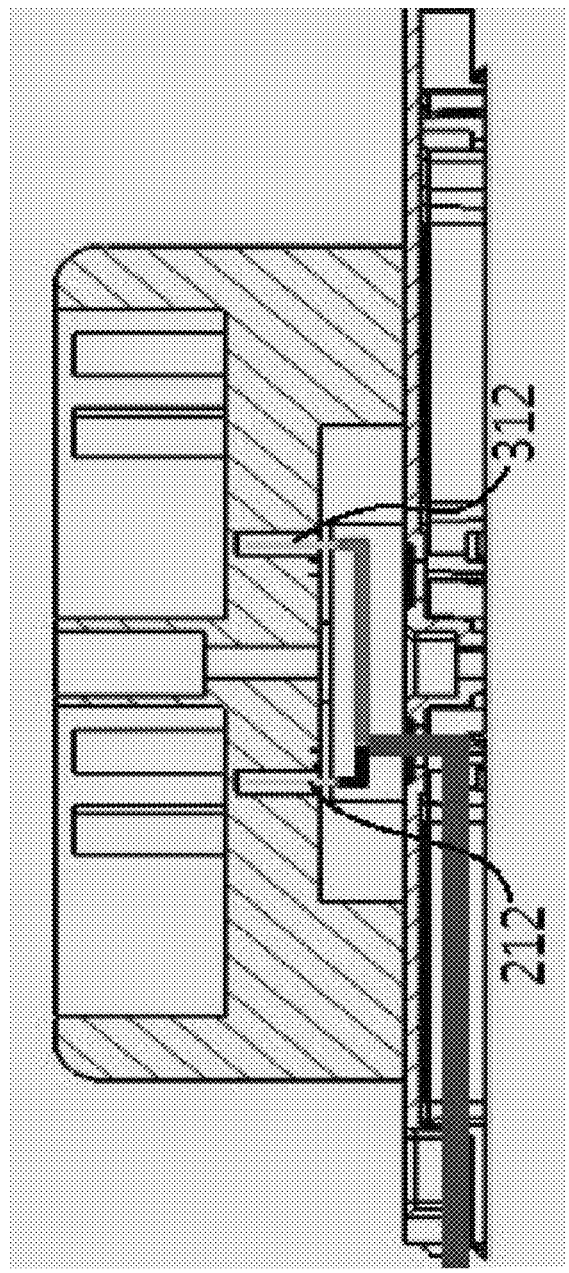

FIG. 3c shows wiring leading-out lines 212 and 312.

Figure 3D:
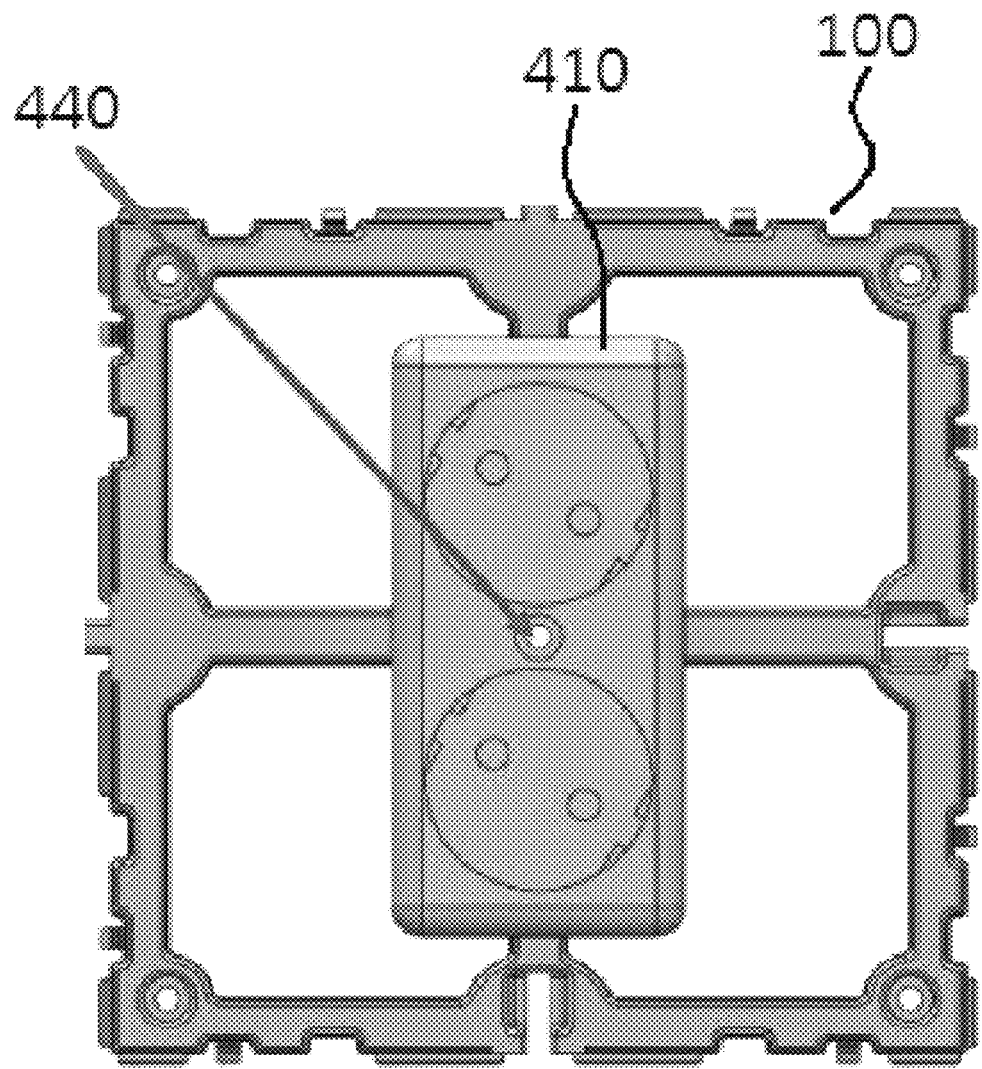
Figure 3E:
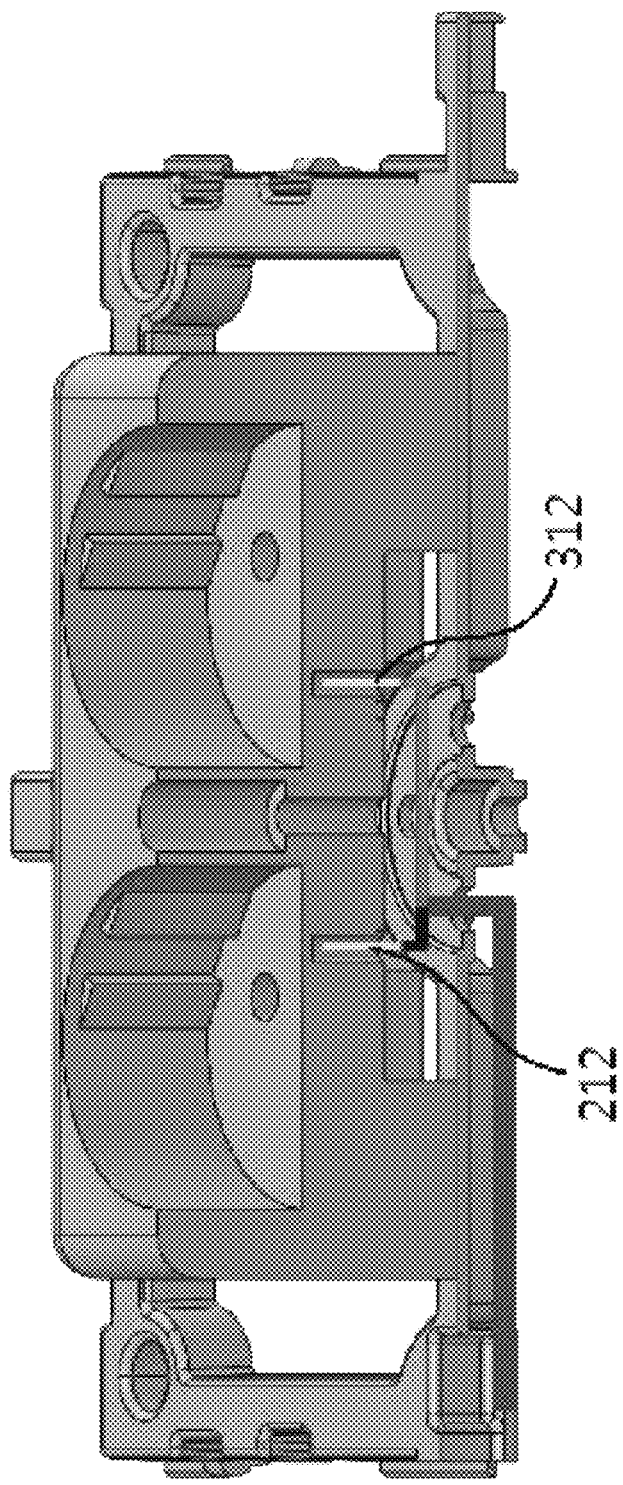

FIG. 3e is a cross-sectional view of a 3D drawing of FIG. 3d.

MODE FOR INVENTION

The present disclosure is to conveniently install and mount various wires, terminals, lamps, etc. using a metal tile and the structure of a bracket for attaching the metal tile to a wall.

As a construction method, a bracket connecting a wall and a tile is constructed on a wall surface, a structure such as a support suitable for the purpose is installed in a spare space of the bracket, and a metal tile having a insertion hole such that the support and the structure can protrude is attached thereon.

Figure 8:
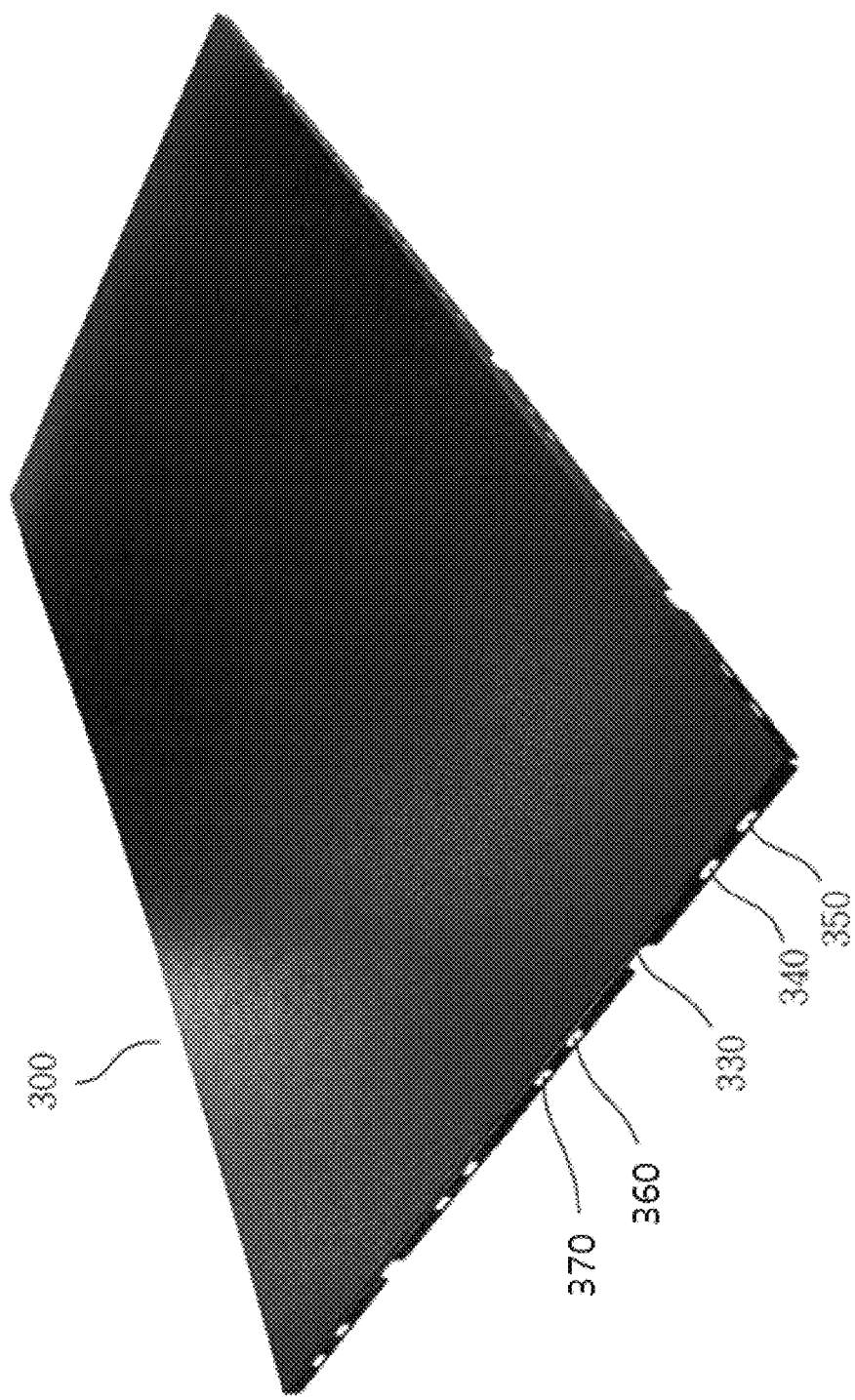
FIG. 8 is a view showing a coupling protrusion hole of a metal panel.
Figure 9:
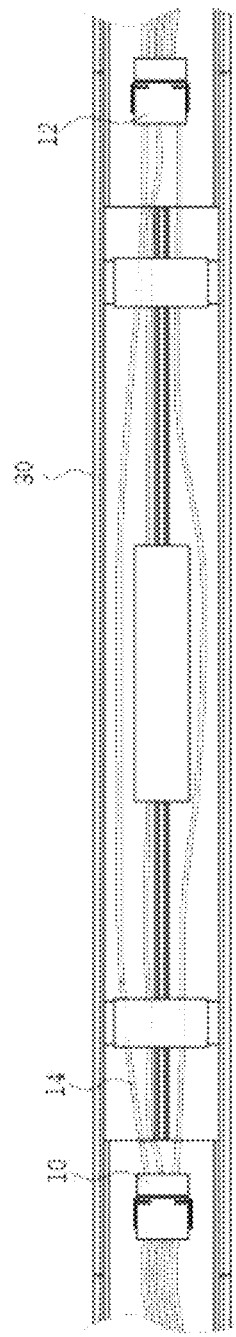
FIG. 9 is a view showing the related art.

FIG. 8 of the present disclosure shows a metal tile without an insertion hole.

FIG. 8 shows a connection portion groove and a coupling protrusion hole to show coupling of a bracket and a metal tile, in which an insertion hole may be machined at the upper portion of a metal panel in various sizes and shapes.

Further, it is also possible to change the bracket in various structures to construct a desired structure on a wall surface.

The application kinds are as follows.

Structures such as various hangers, shelves, and drawers and various decorations are attached to a wall.

Further, it is possible to dispose various wires and terminals (a consent, a switch, a telephone connector, a data communication cable connector, a TV connector, a speaker connector, etc.) at the bracket.

Although it is exemplified to configure a wall-hanging fixing module for a consent, a switch, a lamp, etc. in the present disclosure, any configuration is possible.

A lamp can be configured on the surface of the metal tile by various wires.

That is, the physical structure for receiving various hangers, shelves, drawers, etc. is as follows.

A bottom support of an accessory having a hanger shape is attached in the spare space of the bracket such that the accessory can protrude over it and the metal tile having a corresponding hole is assembled.

2) A hanging structure that can hang picture frames, hats, clothing, etc.

2) A structure that can fix shelves, drawers, etc. and that can be applied to shelves without a support, drawers without a support, etc.

The term 'without a support' means that a support is inserted in the shelve or drawer such that the shelve or drawer is shown like there is no support.

A plurality of hooks is configured between the bracket and the metal tile.

In the present disclosure, 24 hooks are configured for each unit metal tile.

A shelve that applies a considerable weight can be sufficiently supported on a wall by the hooks.

When a shelve or a drawer that supports large load is installed, a support may be additionally coupled to the wall by bolts that are separate fasteners to be able to support additional load.

There is an advantage that when it is required to replace a portion of the metal tile, it is possible to change the interior atmosphere at any time by replacing the attached metal tile through the structure that is easy to attach/detach the metal tile because of the hooks.

It may be possible to reassemble another tile having a different design by separating the assembled tile, and if necessary, it is possible to freely install and remove shelves or various hangers on and from a wall surface.

The metal tile may be assembled with a hole configured to have a corresponding configuration such that a support for supporting a shelve or a hanger is inserted. A hole is machined at the metal tile such that a support that can commonly support various shelves or hangers having different shapes or functions.

It is possible to fix and install shelves or various hangers on the support.

According to the present disclosure, a bracket is configured on a wall surface, a support is fixed in the space of the bracket, a metal plate having a hole at the position corresponding to the support is inserted, and the support is coupled to an insertion hole configured at a shelve.

According to the present disclosure, particularly, a bracket, that is, a bracket having a structure on which various wires and terminals can be installed is configured, and a wiring bracket can be formed in two types of structures.

The first is to be able to connect a wire to a desired portion by forming a structure that can pass the wire at a frame of a bracket. Wiring is configured by forming a passage, through which a wire can be passed, between brackets.

The second is to form a product with a wire (harness) disposed at a bracket to be able to function as a wire, and brackets are connected in a one-touch type or a snap-fit type such that a wire can be connected.

The third is that various terminals configure an exclusive bracket attached to a bracket.

According to the present disclosure, a bracket in which a metal plate is inserted in the upper portion thereof and a lamp can be installed over the metal panel can be implemented in the following two types of products.

1) A structure in which the receptacle of a lamp is directly attached to a bracket is formed so that a desired lamp can be assembled. A hole is formed at a corresponding metal panel to be fitted to a protrusion of the receptacle. The lamp is inserted after the metal panel is completed as an interior material, so an interior wall and a lamp are simultaneously completed. Accordingly, there is an advantage that it is possible to remarkably reduce the time and cost for inserting a lamp through separate work after the interior is completed.

2) An intermediate structure connecting an existing lamp and a bracket has a configuration that is attached to a bracket.

The detailed configuration is as follows.

This is described hereafter with reference to FIGS. 1*a* to 1*d*.

Although wires are described in this embodiment, the wires include all of various data lines including a wire.

A bracket 100 is configured to be attached to a wall and a metal panel 300 is inserted and coupled at the upper portion of the bracket 100.

Ribs 110, 120, 130, and 140 are configured at the bracket 100.

The ribs 110, 120, 130, and 140 configure a space 160.

A wirable bracket is configured by inserting a wiring unit 200 in the space 160.

The wiring unit 200 means a component including first and second embossed terminals 210, 310, and 230 and engraved terminals 220 and 320.

The bracket 100 is configured to be extended and disposed left, right, up, and down, and embossed terminals and engraved terminals 210, 310, 230, 220, and 320 corresponding to a terminal portion are configured such that a wire is connected in a one-touch type between brackets 100.

The terminal portion is a term including the first and second embossed terminals 210, 310, and 230 and engraved terminals 220 and 320.

The wiring unit is composed of embossed terminals 210 and 310 and engraved terminals 220 and 320, or an embossed terminal 210 and an embossed terminal 230, or an engraved terminal 220 and an engraved terminal 320, and the terminals are connected with each other through a wire.

The bracket 100 has coupling protrusions 170 at an edge thereof such that the metal panel is firmly inserted.

A curved portion is configured at an edge of the metal panel, coupling protrusion holes 340, 350, 360 and 370 corresponding to the coupling protrusions 170 are configured at the curved portion, a wire is connected, and then the metal panel 300 that is an interior material is attached such that the electrical wire does not protrude outside.

Of course, it is preferable that a recess for passing a wire is configured at the curved portion of the metal panel.

Further, it is preferable to configure a coupling avoidance space 175 such that the metal panel is fitted on the coupling protrusions.

The bracket 100 is configured in a rectangular shape, the ribs 110, 120, 130, and 140 are configured at four positions inside a center portion of each side of the rectangle, and the four ribs 110, 120, 130, and 140 are concentrated to a center portion to configure a frame of the bracket 100.

Figure 2A:
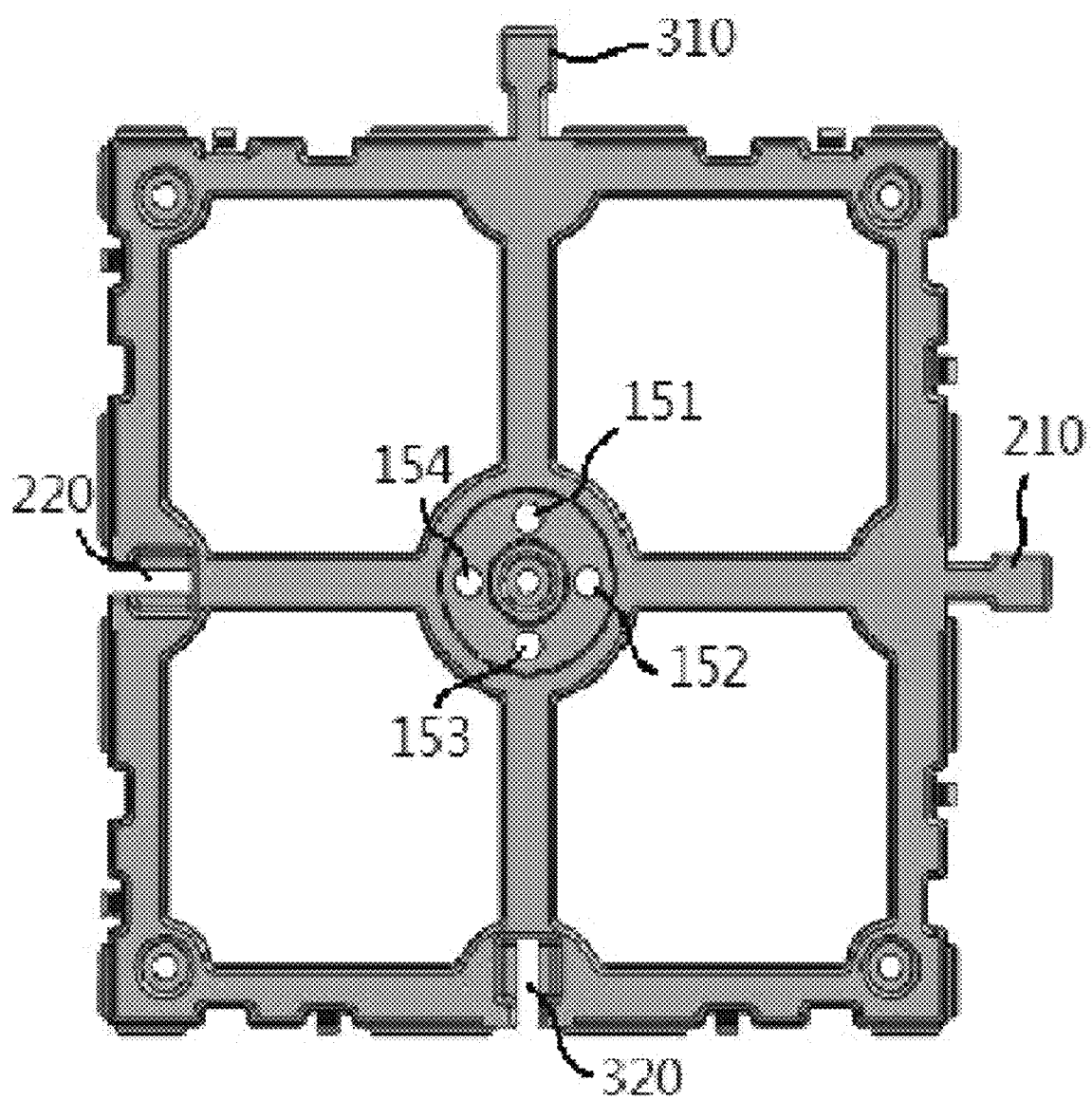
FIG. 2a is a front view of a bracket having a wire drawing-out hole to draw out the wire of a consent or a switch at a center portion of a bracket.

FIG. 2*a* is a front view of a bracket having wire drawing-out holes 151, 152, 153, and 154 to draw out the wire of a consent or a switch at a center portion of a bracket.

It is not necessary to configure the wire drawing-out holes 151, 152, 153, and 154 at all center portions.

Figure 2B:
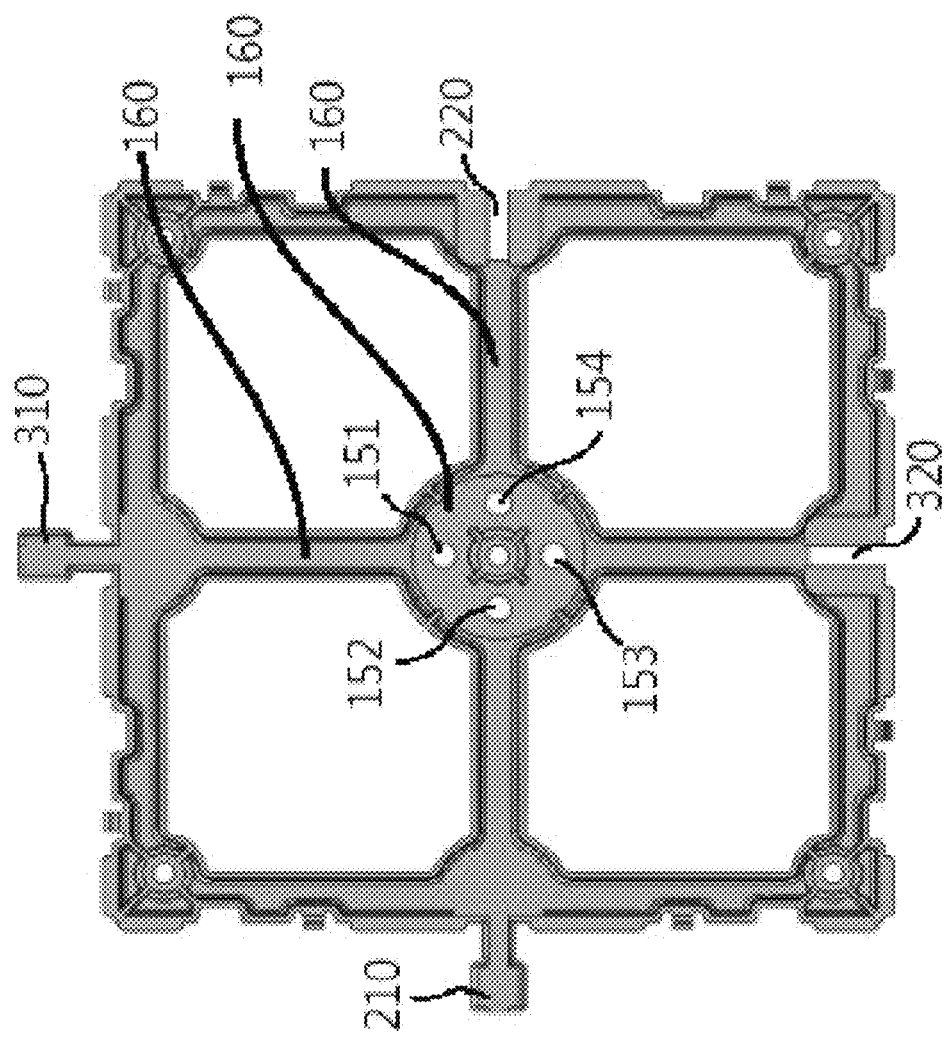

FIG. 2*b* is a rear view of FIG. 2*a*.

Figure 2C:
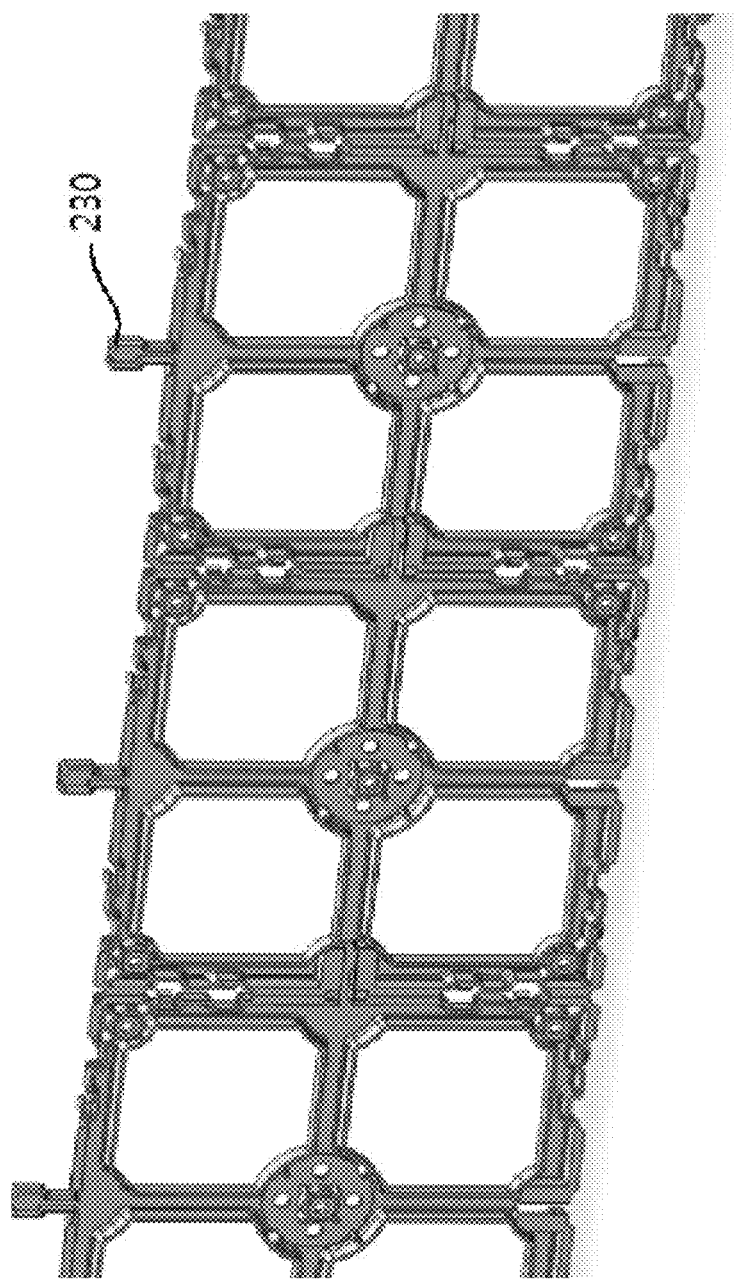
FIG. 2c is a view showing connection of unit brackets.

FIG. 2*c* is a view showing connection of unit brackets.

Figure 2D:
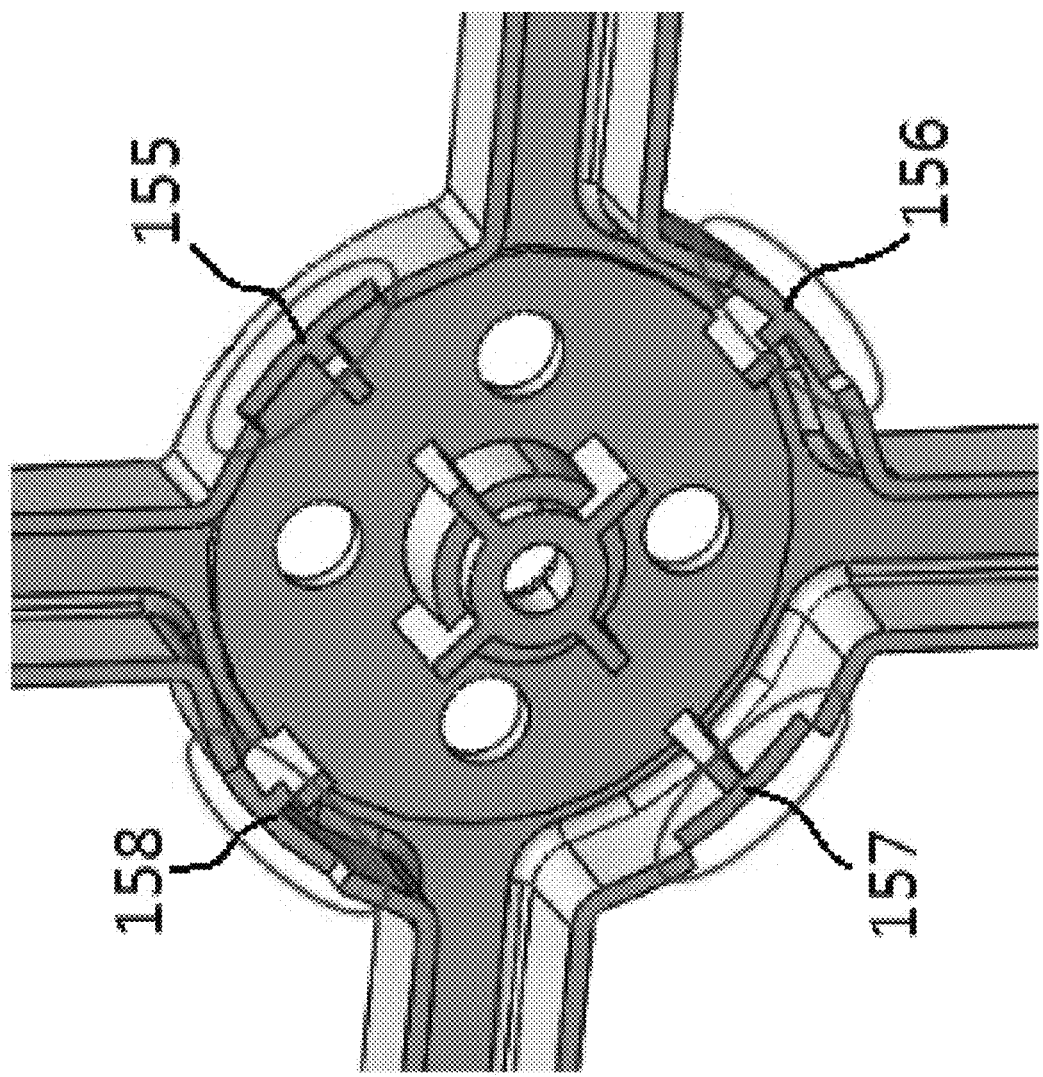
FIG. 2d is a view showing a configuration for coupling a consent, a switch, and a fixing module at a coupling portion that is a center portion of a bracket.
Figure 5A:
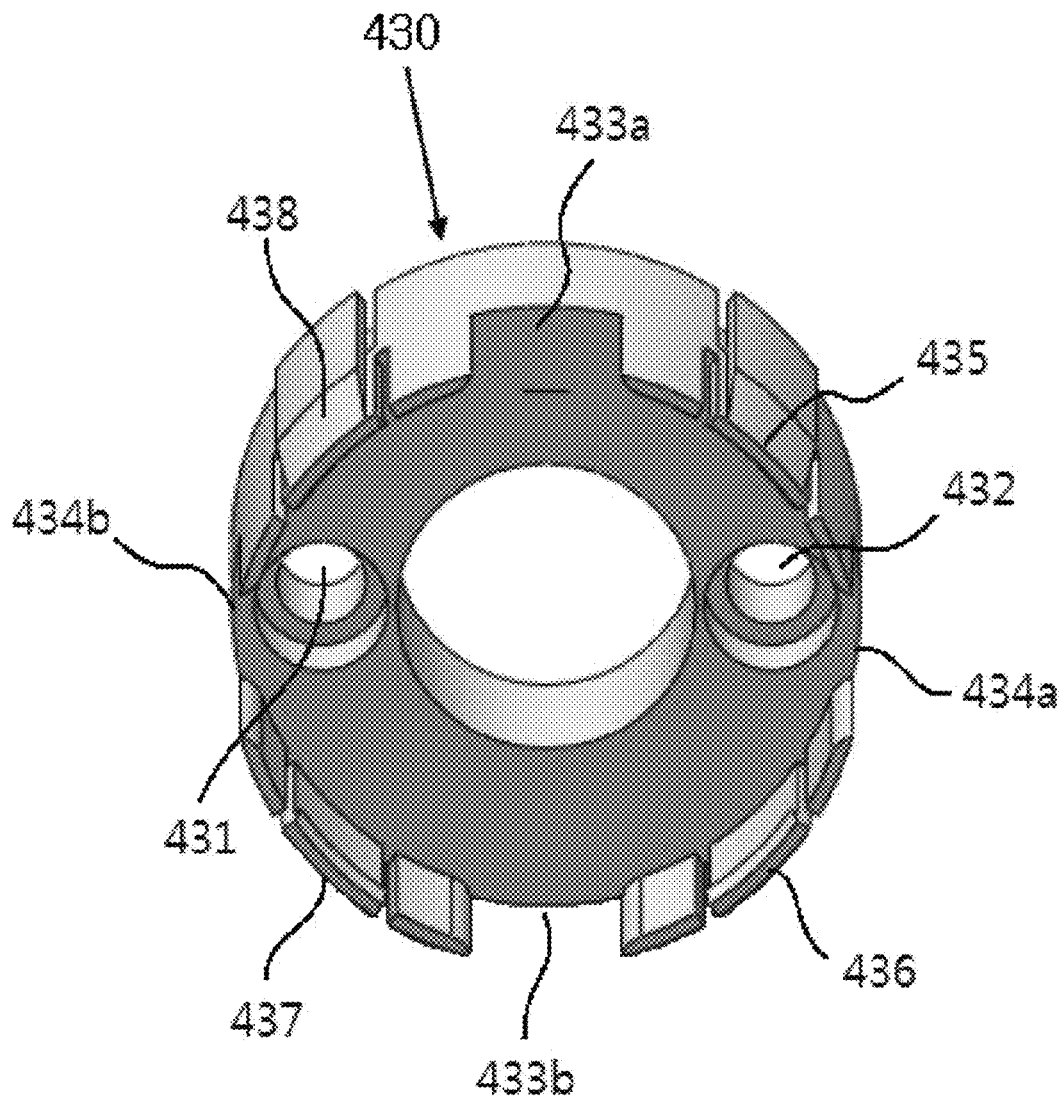
FIGS. 5a to 5d are views showing a wall-hanging fixing module and a module coupling method of fixing the wall-hanging fixing module to a bracket.
Figure 5B:
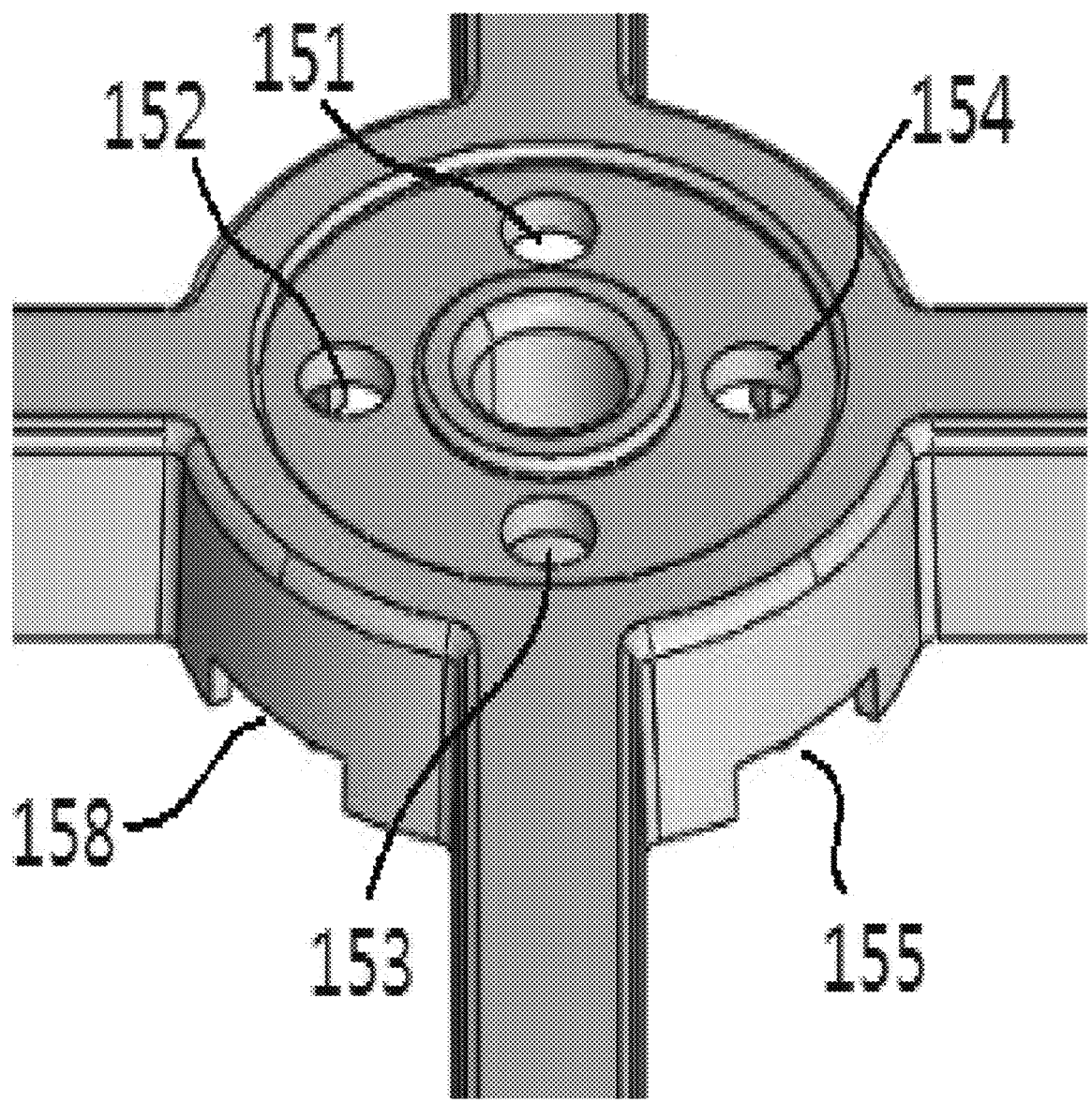
Figure 5C:
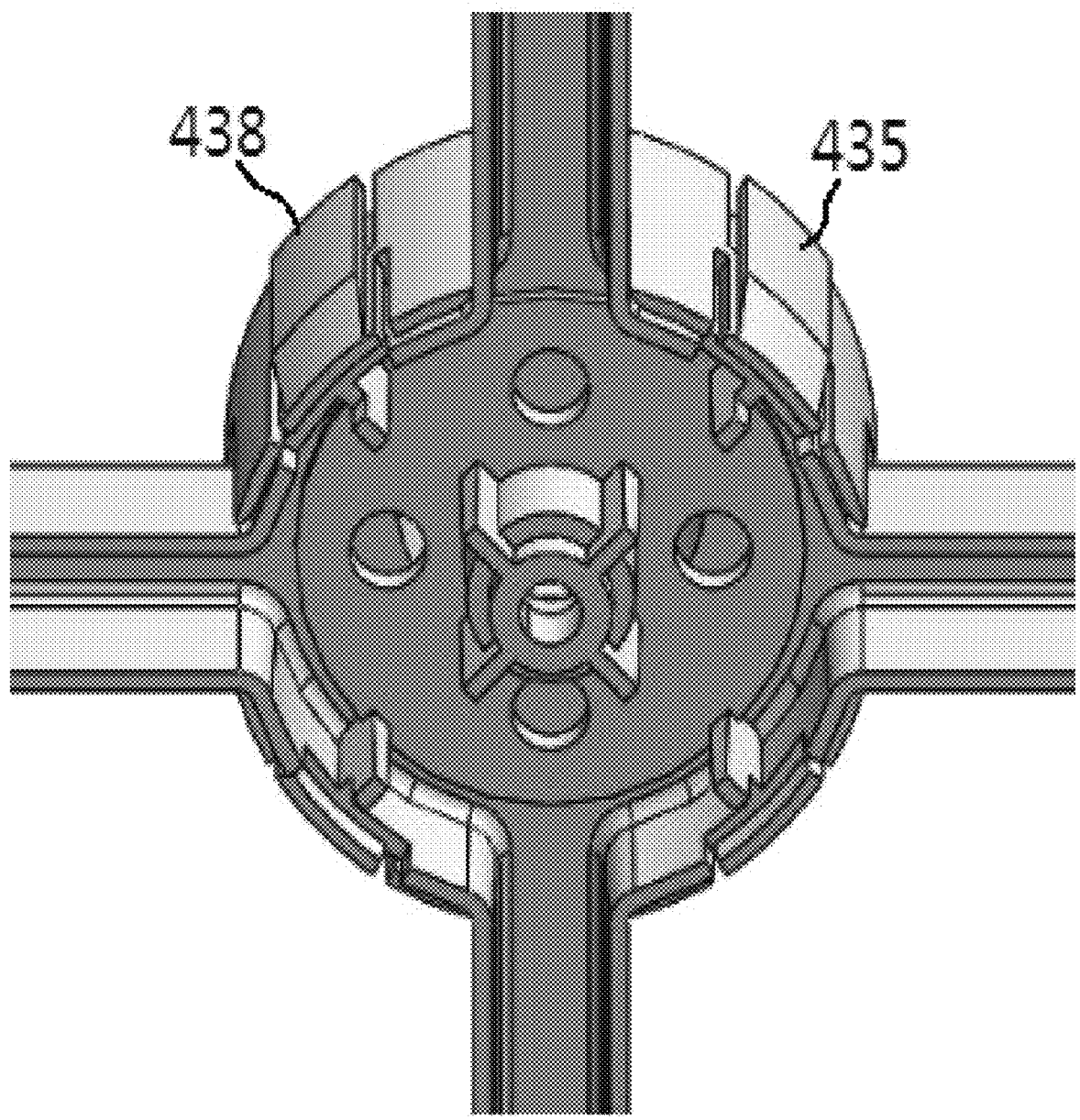
Figure 5D:
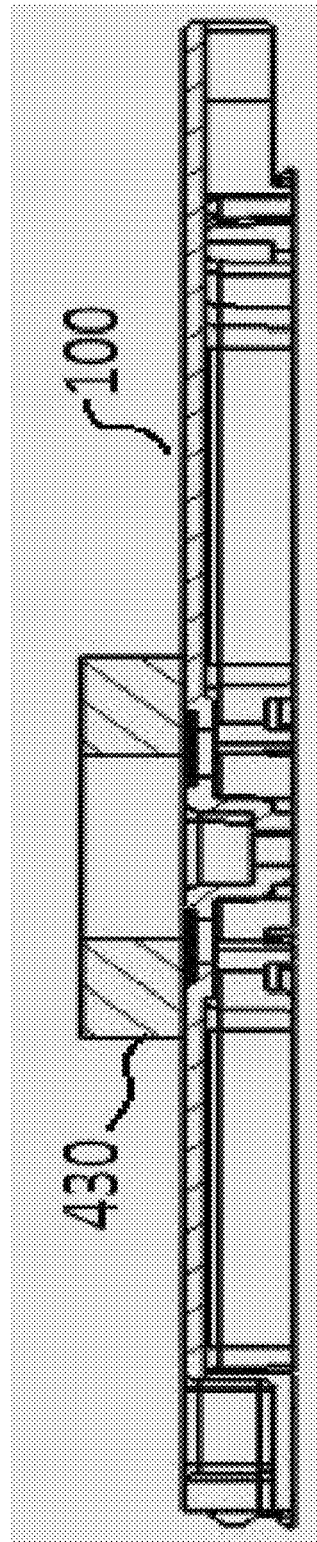

FIG. 2*d* is a view showing a configuration for selectively inserting and coupling a consent module 410, a switch module 420, a wall-hanging fixing module 430 of FIG. 5*a* into the coupling portion 150 configured at a center portion of the bracket.

A space 160 is configured at the coupling portion 150 so that wires are disposed, whereby a wirable bracket is configured. A corresponding portion of the metal panel 300 is cut off at a coupling portion for fixing the consent module, the switch module, and the wall-hanging fixing module so that the consent module 410, the switch module 420, and the wall-hanging fixing module 430 are conveniently selectively inserted and fixed.

Of course, only one module is configured at one coupling portion.

The wire drawing-out holes 151, 152, 153, and 154 are configured at the coupling portion 150 so that wires are drawn out.

A line passes through a center portion of the coupling portion 150 to be drawn out to another rib or outside the wire drawing-out holes 151, 152, 153, and 154, as shown in FIG. 2*b*.

FIGS. 4*a* to 4*d* are views showing fixing of the switch module 420 to the bracket 100.

The module device that is coupled to the coupling recessions 155, 156, 157, and 158 is the switch module 420 and switch coupling protrusions 425 are configured at a lower portion of the switch module 420 for coupling.

The coupling recessions 155, 156, 157, and 158 and the switch coupling protrusions 425 are coupled and decoupled in a one-touch type 424 to be easily fixed and separated to and from the bracket.

Protrusions 426 and 427 that are configurations for insertion in the coupling recessions 155, 156, 157, and 158 of the coupling portion 150 are configured at the switch coupling protrusions 425.

The protrusions 426 and 427 are configured to be unlocked and locked when they are opened outward and closed inward, respectively, in a one-touch type by touching the locking/unlocking switch portion 424. The protrusions are shown at two points at a lower portion by reference numerals, but are actually provided at four positions at the upper portion and are not clearly shown due to the bottom perspective view.

FIGS. 5*a* to 5*d* are views showing the wall-hanging fixing module 430 and a module coupling method of fixing the wall-hanging fixing module 430 to the coupling portion 150 of the bracket.

The module device that is coupled to the coupling recessions 155, 156, 157, and 158 of the coupling portion is the wall-hanging fixing module 430 for a lamp and is configured to be coupled to wall-hanging coupling protrusions 435, 436, 437, and 438 at a lower portion of the wall-hanging fixing module 430.

When the wall-hanging coupling protrusions 435, 436, 437, and 438 are held by hand in four directions, the protrusions are opened to be easily unlocked from or locked to the coupling portion 150 of the bracket.

It is preferable that vertical recessions 433a and 433b and horizontal recessions 434a and 434b are configured at portions corresponding to the ribs at the lower portion of the wall-hanging fixing module 430 so that the lower portion is seated in close contact with the ribs 110, 120, 130, and 140.

Figure 6:
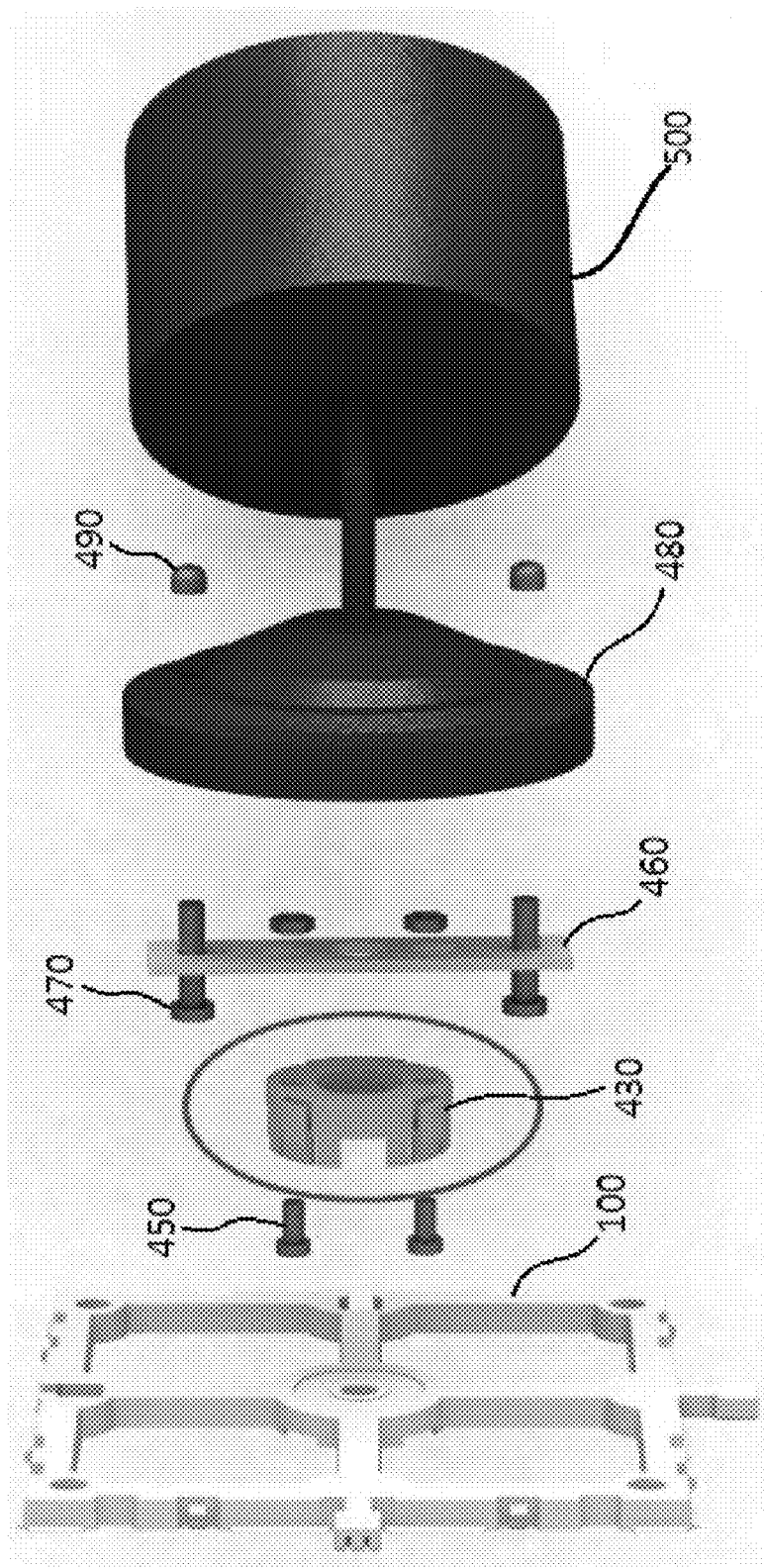
FIG. 6 is a view showing coupling of a lamp with a wall-hanging fixing module.

FIG. 6 is a view showing coupling a lamp 500 together with the wall-hanging fixing module 430.

The wall-hanging fixing module 430 has first coupling holes 431 and 432 to couple an intermediate member 460 to couple a base member 480 supporting the lamp 500 having various sizes.

First bolt portions 450 are configured to be screw-fastened to the intermediate member 460 through the first coupling holes 431 and 432. Second bolt portions 470 are configured to screw-fasten and fix the intermediate member 460 and the lamp 500.

Corresponding nut portions 490 are also configured to be coupled to the second bolt portions 470.

Figure 7:
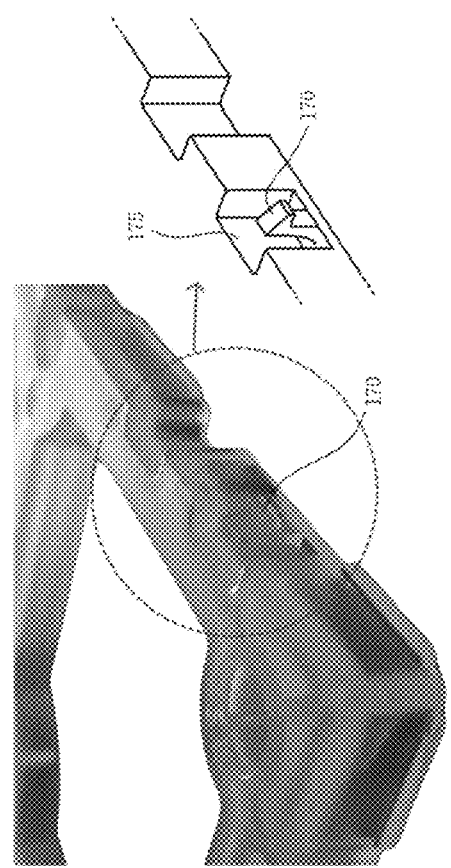
FIG. 7 is a view showing a coupling protrusion of a bracket.

FIG. 7 is a view showing a coupling protrusion of a bracket.

As shown in FIG. 7, a coupling avoidance space 175 is configured on the rear surface of the coupling protrusion 170 so that a metal panel 300 can be coupled well through the coupling avoidance space 175.

FIG. 8 is a view showing a coupling protrusion hole of a metal panel.

FIG. 8 is described hereafter.

Coupling protrusion holes 340, 350, 360 and 370 of a hole-machined metal panel 300 are formed to be coupled to the coupling protrusions 170, and connection portion grooves 330 are formed at the metal panel 300 to correspond to connectors (not shown) inserted in the connection portion grooves 330.

It is preferable that two coupling protrusion holes 340, 350, 360 and 370 are formed at the left and right of the connection portion groove 330.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the disclosure.

Therefore, the configurations described in the embodiments and drawings of the present disclosure are merely most preferable embodiments but do not represent all of the technical spirit of the present disclosure. Thus, it should be understood that the present disclosure should be construed as including all the changes, equivalents, and substitutions included in the spirit and scope of the present disclosure at the time of filing this application.

INDUSTRIAL APPLICABILITY

According to the present disclosure, an interior material composed of a metal panel is completed and then a wall-hanging fixing module, etc. for installing a consent module, a switch module, a lamp, etc. are inserted, whereby an interior wall and electrical wires are simultaneously constructed. The present disclosure has an effect that it is possible to greatly reduce time and costs for the configuration of inserting a device according to electrical wires by performing separate work after the interior is completed, so it has industrial applicability.

The invention claimed is:

1. A wirable bracket comprising:
   a bracket in a square shape that is attached to a wall;
   ribs configured inwardly from outside the bracket in the square shape so as to ensure stiffness of the bracket;
   a space configured in a way that back sides of the ribs face toward the wall to which the bracket is attached and are open; and
   a wiring portion inserted in the space,
   wherein a metal panel is inserted and coupled at an upper portion of the bracket.

2. The wirable bracket of claim 1, wherein the bracket is configured to be extended and disposed left, right, up, and down, and
   wherein a terminal portion is configured such that wires are connected in a one-touch type between a plurality of brackets and adjacent brackets.

3. A module coupling device having a module device coupled to a coupling portion configured at an intersection of the ribs of the wirable bracket of claim 2, and coupled to at an upper portion of a portion corresponding to the coupling portion.

4. The wirable bracket of claim 1, wherein the wiring portion is composed of an embossed terminal and an engraved terminal, or the embossed terminal and the embossed terminal, or the engraved terminal and the engraved terminal at an end of the space, and
   wherein the terminals are connected through a wire.

5. A module coupling device having a module device coupled to a coupling portion configured at an intersection of the ribs of the wirable bracket of claim 4, and coupled to an upper portion of a portion corresponding to the coupling portion.

6. The wirable bracket of claim 1, wherein coupling protrusions are configured at four edges of the bracket such that the metal panel is firmly inserted, a curved portion is configured at four edges in a square shape of the metal panel, coupling protrusion holes corresponding to the coupling protrusions are configured at the curved portion, a wire is connected, and then the metal panel that is an interior material is attached such that the wire does not protrude outside.

7. A module coupling device having a module device coupled to a coupling portion configured at an intersection of the ribs of the wirable bracket of claim 6, and coupled to an upper portion of a portion corresponding to the coupling portion.

8. The wirable bracket of claim 1, wherein the bracket is configured in the square shape,
   wherein the ribs are configured at four positions, respectively, inwardly from a center portion of each side of the square, and
   wherein the four ribs intersect at a coupling portion from the center portion to configure a frame of the bracket for stiffness.

9. The wirable bracket of claim 8, wherein a space is configured at the coupling portion such that wires are disposed.

10. The wirable bracket of claim 9, wherein wire drawing-out holes are configured at the coupling portion such that the wires are drawn out in order to couple a consent module and a switch module on a top of the coupling portion.

11. The wirable bracket of claim 8, wherein wire drawing-out holes are configured at the coupling portion such that wires are drawn out in order to couple a consent module and a switch module on a top of the coupling portion.

12. A module coupling device having a module device coupled to a coupling portion configured at an intersection of the ribs of the wirable bracket of claim 1, and coupled to at an upper portion of a portion corresponding to the coupling portion.

13. The module coupling device of claim 12, wherein coupling recessions are configured at a portion, where the ribs are not configured, on a bottom of the coupling portion.

14. The module coupling device of claim 13, wherein the module device coupled to the coupling portion is a switch module, and
    wherein switch coupling protrusions are configured at a lower portion of the switch module.

15. The module coupling device of claim 14, wherein the coupling recessions and the switch coupling protrusions are coupled and decoupled by a one-touch type locking/unlocking switch portion.

16. The module coupling device of claim 13, wherein the module device coupled to the coupling recessions is a consent module, and
    wherein consent coupling protrusions are configured at a lower portion of the consent module.

17. The module coupling device of claim 16, wherein a wall fixing hole is configured at a center portion of the consent module for fastening to the wall.

18. The module coupling device of claim 13, wherein the module device coupled to the coupling recessions is a wall-hanging fixing module for a lamp and is coupled to wall-hanging coupling protrusions formed at a lower portion of the wall-hanging fixing module.

19. The module coupling device of claim 18, wherein recessions corresponding to the ribs are configured at the lower portion of the wall-hanging fixing module to be seated on the ribs.

20. The module coupling device of claim 18, wherein the wall-hanging fixing module has first coupling holes to couple an intermediate member to couple a base member supporting the lamp having various sizes, is configured to be screw-fastened to the intermediate member through the first coupling holes, and screw-fastens the intermediate member and the base member of the lamp.

\* \* \* \* \*